(12) United States Patent
Lefebvre

(10) Patent No.: US 8,149,845 B2
(45) Date of Patent: Apr. 3, 2012

(54) NETWORK FOR EXCHANGING PACKET SIGNALS VIA A POOLED CONNECTION

(75) Inventor: Pascal Albert Emile Lefebvre, Brussels (BE)

(73) Assignee: Alcatel Lucent, Paris (FR)

( * ) Notice: Subject to any disclaimer, the term of this patent is extended or adjusted under 35 U.S.C. 154(b) by 2107 days.

(21) Appl. No.: 10/337,266

(22) Filed: Jan. 7, 2003

(65) Prior Publication Data

US 2003/0128666 A1 Jul. 10, 2003

(30) Foreign Application Priority Data

Jan. 8, 2002 (EP) .................................. 02290028

(51) Int. Cl.
*H04L 12/28* (2006.01)
*H04L 12/56* (2006.01)
*G06F 15/16* (2006.01)

(52) U.S. Cl. ............... 370/395.4; 370/235; 370/232; 709/227

(58) Field of Classification Search .................. None
See application file for complete search history.

(56) References Cited

U.S. PATENT DOCUMENTS

| | | | |
|---|---|---|---|
| 5,070,498 A | 12/1991 | Kakuma et al. | |
| 5,553,242 A * | 9/1996 | Russell et al. | 709/227 |
| 5,864,541 A | 1/1999 | Abu-Amara et al. | |
| 5,914,948 A | 6/1999 | Frank | |
| 6,105,067 A * | 8/2000 | Batra | 709/227 |
| 6,147,970 A | 11/2000 | Troxel | |
| 6,324,581 B1 * | 11/2001 | Xu et al. | 709/229 |
| 6,338,089 B1 * | 1/2002 | Quinlan | 709/227 |
| 6,411,986 B1 * | 6/2002 | Susai et al. | 709/203 |
| 6,631,417 B1 * | 10/2003 | Balabine | 709/229 |
| 7,016,945 B2 * | 3/2006 | Bellaton et al. | 709/219 |
| 7,143,131 B1 * | 11/2006 | Soles et al. | 709/203 |
| 7,152,111 B2 * | 12/2006 | Allred et al. | 709/227 |
| 7,415,038 B2 * | 8/2008 | Ullmann et al. | 370/468 |
| 7,570,587 B1 * | 8/2009 | Wilson et al. | 370/230 |
| 7,580,972 B2 * | 8/2009 | Jones et al. | 709/203 |
| 7,587,493 B1 * | 9/2009 | Sheth | 709/226 |
| 2001/0015978 A1 | 8/2001 | Blanset et al. | |
| 2002/0065882 A1 * | 5/2002 | Arkin et al. | 709/204 |
| 2003/0120793 A1 * | 6/2003 | Marjola | 709/231 |
| 2003/0177179 A1 * | 9/2003 | Jones et al. | 709/203 |
| 2007/0088826 A1 * | 4/2007 | Raphel et al. | 709/225 |

FOREIGN PATENT DOCUMENTS

| | | |
|---|---|---|
| EP | 0 411 674 A2 | 2/1991 |
| WO | WO 95/27384 A1 | 10/1995 |
| WO | WO 00/64135 A1 | 10/2000 |

* cited by examiner

*Primary Examiner* — Warner Wong
(74) *Attorney, Agent, or Firm* — Sughrue Mion, PLLC

(57) ABSTRACT

Networks for exchanging packet signals between first network-units (1) like access providers and/or access multiplexers coupled to terminals and second network-units (2) like service providers and/or gateways coupled to further networks can be improved by providing a network with a pooled connection (3) having a capacity smaller than a sum of all terminal-capacities, which sum equals the capacity necessary in case all terminals communicate via the network at the same time. This pooled connection (3) is located between said first (1) and second (2) network-unit and is managed by a manager (23) in said second network-unit (2). By providing a first network-unit (1) with a router (12) managed by a manager (13), control traffic can be routed transparently to said second network-unit (2). By providing a manager (23) in the second network-unit (2) with a controller (28), the capacity of said pooled connection (3) can be controlled and guarded.

24 Claims, 1 Drawing Sheet

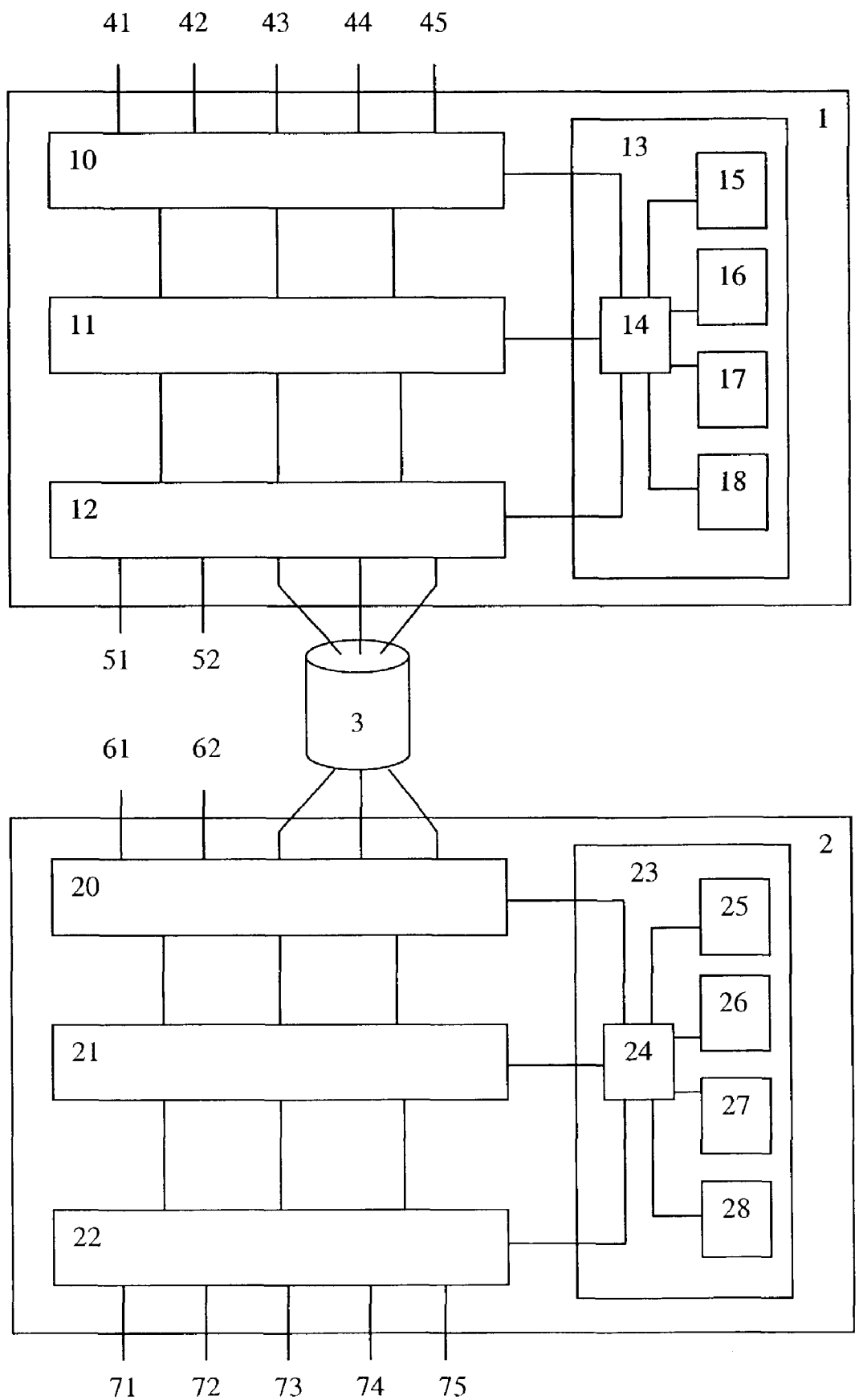

NETWORK FOR EXCHANGING PACKET SIGNALS VIA A POOLED CONNECTION

BACKGROUND OF THE INVENTION

The invention relates to a network for exchanging packet signals between network-units and comprising a first network-unit coupled to terminals and a second network-unit coupled to said first network-unit and to a further network.

The invention further relates to a first network-unit for use in a network for exchanging packet signals between network-units and comprising said first network-unit coupled to terminals and a second network-unit coupled to said first network-unit and to a further network, to a second network-unit for use in a network for exchanging packet signals between network-units and comprising a first network-unit coupled to terminals and said second network-unit coupled to said first network-unit and to a further network, to a method for exchanging packet signals between network-units in a network comprising a first network-unit coupled to terminals and a second network-unit coupled to said first network-unit and to a further network, and to a processor program product to be run via a network-unit's processor for exchanging packet signals between network-units in a network comprising a first network-unit coupled to terminals and said second network-unit coupled to said first network-unit and to a further network.

Such a network is generally known, with said first network-unit for example being an access provider and/or comprising an access multiplexer, and with said second network-unit for example being a service provider and/or comprising a gateway. In a first situation, the first network-unit is transparent for control traffic, with a packet capacity between both network-units for example being sufficient to allow all terminals to communicate at the same time. In a second situation, the first network-unit is not transparent for control traffic and is used for setting up connections.

The known network is disadvantageous, inter alia, in said first situation, due to an available network packet capacity between said network-units needing to be reserved to allow each terminal coupled to said first network-unit to use this network at the same time, which is inefficient, and in said second situation, due to said first network-unit being too busy with setting up connections (and dealing with control traffic).

SUMMARY OF EXEMPLARY EMBODIMENTS OF THE INVENTION

It is an object of the invention, inter alia, of providing a network as defined in the preamble which is more efficient, without requiring said first network-unit setting up connections.

The network according to the invention is characterised in that said network comprises a pooled connection between both network-units, with a capacity of said pooled connection being smaller than a sum of all terminal-capacities, and with said second network-unit comprising a manager for managing said exchanging.

By providing the network with the pooled connection having a capacity smaller than a sum of all terminal-capacities, the efficiency of the network is increased a lot. Thereby, said first network-unit can be transparent for control traffic and does not need to set up connections, due to said manager in said second network-unit taking care of that. The sum of all terminal-capacities is for example equal to the capacity necessary in case all terminals communicate via the network at the same time. The pooled connection for example comprises a predefined number of lines and/or frequency bands and/or wavelengths and/or time slots etc.

The invention is based on the insight, inter alia, that packet switched networks, like ordinary telephony networks, usually just need a small percentage of the maximum capacity, in other words, just a reduced capacity of said maximum capacity needs to be reserved, and that management can be relocated, and is based upon the basic idea, inter alia, that a pooled connection can be used for guaranteeing said reduced capacity, and that the management can be located in the second network-unit.

The invention solves the problem, inter alia, of providing a network as defined in the preamble which is more efficient, without requiring said first network-unit setting up signalled connections (with signalled connections being connections to be set up through signalling).

A first embodiment of the network according to the invention is characterised in that said first network-unit comprises a router for routing control packet signals comprising control information originating from terminals to said second network-unit.

By providing said first network-unit with said router, one or more control packet signals comprising control information for setting up for example a voice connection is/are automatically routed to said second network-unit. Thereto, for example a converter converts said control information into one or more control packet signals. Due to said control packet signal(s) being control traffic, this/these control packet signal(s) is/are not necessarily sent via said pooled connection, but may use other connections. The pooled connection is at least mainly or entirely for data traffic like voice traffic.

A second embodiment of the network according to the invention is characterised in that said first network-unit comprises a manager comprising a receiver for receiving said control information and a detector coupled to said receiver for detecting said control information for in response to said detecting managing the router.

By providing the manager in the first network-unit with said receiver for receiving said control information and/or said control packet signal(s), and said detector for detecting said control information and/or said control packet signal(s), said manager in the first network-unit can manage the router for example for selecting one out of many second-network-units (like for example gateways) and/or one out of many pooled connections.

A third embodiment of the network according to the invention is characterised in that said manager in said second network-unit comprises a receiver for receiving control packet signals from the first network-unit and a detector coupled to said receiver for detecting these control packet signals and a sender coupled to said detector for setting up connections via said further network in response to said control packet signals.

By providing said second network-unit with said receiver, detector and sender, for example a voice connection defined by said control information is automatically set up via said further network. Thereto, said detector for example detects an identification code and/or a service code and/or a pooling code in a header of said control packet signal(s), and in response instructs said sender to send one or more further control packet signal(s) via said further network for setting up for example said voice connection. Either said further control packet signal(s) comprise(s) an identification code and/or a service code and/or a pooling code in a header directly defining that data traffic like voice traffic should use the pooled connection, or said further control packet signal(s) comprise(s) a code in a header indirectly defining that data traffic like voice traffic should use the pooled connection. In response to one or more responding control packet signal(s) arriving via the further network, which responding packet signal(s) is/are received by said receiver and is/are detected by said detector, the detector instructs said sender to send said/further responding packet signal(s) to said first network-unit, but for example just for conversion purposes, after which the information is sent to the terminal(s). Thereby, said responding packet signal(s) either comprise(s) an identification code and/or a service code and/or a pooling code in a header directly defining that data traffic like voice traffic should use the pooled connection, or said responding packet signal(s) comprise(s) a code in a header indirectly defining that data traffic like voice traffic should use the pooled connection.

A fourth embodiment of the network according to the invention is characterised in that said manager in said second network-unit comprises a controller for controlling the capacity of said pooled connection.

By providing the second network-unit with said controller, the capacity of said pooled connection is guarded. Thereto, said controller is coupled to said detector for in response to said detecting of said (responding) control packet signal(s) for example increasing a counter value and comparing the counter value with a threshold.

A fifth embodiment of the network according to the invention is characterised in that data packet signals, comprising data information originating from and/or destined for said terminals, flow via said pooled connection.

The use of said pooled connection for data traffic like voice traffic is an efficient solution which allows the complexity of said first network-unit to remain at lower level.

Embodiments and further embodiments of the first network-unit according to the invention and of the second network-unit according to the invention and of the method according to the invention (and comprising further method steps) and of the processor program product to be run via a (first and/or second) network-unit's processor according to the invention (and comprising further functions) are in correspondence with the embodiments of the network according to the invention.

U.S. Pat. No. 5,070,498 discloses a call control system in an ATM switch, U.S. Pat. No. 5,864,541 discloses a method and system for simultaneous service capacity calculation for multimedia services under aggregate traffic conditions, and U.S. Pat. No. 6,147,970 discloses quality of service management for aggregated flows in a network system. None of these references discloses the network according to the invention, the network-units according to the invention, the method according to the invention and the processor program product according to the invention. All these references including references cited in these references are considered to be incorporated.

BRIEF DESCRIPTION OF THE DRAWINGS

The invention will be further explained more detailledly at the hand of an example shown in the drawing, whereby FIG. 1 discloses a network according to the invention comprising a first network-unit according to the invention and a second network-unit according to the invention.

DETAILED DESCRIPTION OF EXEMPLARY EMBODIMENTS

FIG. 1 discloses a first network-unit 1 comprising a switch 10 coupled externally via connections 41-45 to fixed terminals or to mobile terminals via base stations not shown and internally to a buffer/converter 11 which is further coupled internally to a router 12, which is coupled externally to connections 51 and 52 and to a pooled connection 3 comprising for example three connections hereby defined as 53-55 which in case of first network-unit 1 being separated from the network form an in/output to be coupled to said pooled connection 3. Switch 10, buffer/converter 11 and router 12 are coupled internally to a manager 13, comprising a processor 14 coupled to said switch 10, buffer/converter 11 and router 12 and to a receiver 15, a sender 16, a detector 17 and a controller 18.

A second network-unit 2 comprises a (de)multiplexer 20 coupled externally to connections 61 and 62 and to said pooled connection 3 comprising for example three connections hereby defined as 63-65 (which in case of second network-unit 2 being separated from the network form an in/output to be coupled to said pooled connection 3) and internally to a buffer/converter 21 which is further coupled internally to a (de)multiplexer 22, which is coupled externally to connections 71-75. (De)multiplexer 20, buffer/converter 21 and (de)multiplexer 22 are coupled internally to a manager 23, comprising a processor 24 coupled to said (de)multiplexer 20, buffer/converter 21 and (de)multiplexer 22 and to a receiver 25, a sender 26, a detector 27 and a controller 28.

Said first network-unit 1 is for example an access provider and/or comprises an access multiplexer, like for example (at least parts of) the combination of switch 10, buffer/converter 11 and router 12, and said second network-unit 2 is for example a service provider and/or comprises a gateway, like for example (at least parts of) the combination of (de)multiplexer 20, buffer/converter 21 and (de)multiplexer 22. In a first situation, the first network-unit 1 is transparent for control traffic, with a packet capacity between both network-units 1,2 for example being sufficient to allow all terminals to communicate at the same time. In a second situation, the first network-unit 1 is not transparent for control traffic and is used for setting up connections and is then at least partly managing the exchange of packet signals.

Prior art networks are disadvantageous, inter alia, in said first situation, due to an available network packet capacity between said network-units 1,2 needing to be reserved to allow each terminal coupled to said first network-unit 1 to use this network at the same time, which is inefficient, and in said second situation, due to said first network-unit 1 being too busy with setting up connections (and dealing with control traffic). This available network packet capacity is for example equal to the sum of the capacities of connections 51-55 and 61-65 when coupled to each other.

It is an object of the invention, inter alia, of providing a network as defined in the preamble which is more efficient, without requiring said first network-unit 1 setting up connections. Thereto, said network according to the invention is characterised in that said network comprises a pooled connection 3 between both network-units 1,2, with a capacity of said pooled connection 3 being smaller than a sum of all terminal-capacities, and with said second network-unit 2 comprising said manager for managing said exchanging. By providing the network with the pooled connection 3 having a capacity smaller than a sum of all terminal-capacities, the efficiency of the network is increased a lot. Thereby, due to second network-unit 2 taking care of managing said exchanging of packet signals, said first network-unit 1 can be transparent for control traffic and does not need to set up connections. The sum of all terminal-capacities is for example equal to the capacity necessary in case all terminals communicate via the network at the same time. The pooled connection 3 for example comprises a predefined number of lines and/or frequency bands and/or wavelengths and/or time slots etc.

Said first network-unit 1 comprises a router 12 for routing control packet signals comprising control information originating from terminals to said second network-unit 2, which control packet signal(s) comprising control information for setting up for example a voice connection is/are automatically routed to said second network-unit 2. Thereto, for example buffer/converter 11 converts said control information into one or more control packet signals. Due to said control packet signal(s) being control traffic, this/these control packet signal(s) is/are not necessarily sent via said pooled connection 3, but may use other connections 51,52,61,62. The pooled connection 3 is at least mainly or entirely for data traffic like voice traffic.

Said first network-unit 1 comprises a receiver 15 for receiving said control information and/or said control packet signal(s) from terminals arriving via one of the connections 41-45, which control information flows via switch 10 either directly via processor 14 to receiver 15 or indirectly via buffer/controller 11 and processor 14 to receiver 15. Detector 17 coupled to said receiver 15 via processor 14 detects this control information from the terminals, whereby either an identification code and/or a service code and/or a pooling code in said control information are being detected, or an identification code and/or a service code and/or a pooling code linked to said control information are being detected (with for example information about the specific connection 41-45 via which said control information has arrived comprising a code linked to said control information). In response to this detecting, manager 13 (comprising, inter alia, receiver 15, detector 17 and processor 14) manages router 12 in such a way that for example one out of many second-network-units (like for example gateways) and/or one out of many pooled connections is/are selected.

Said second network-unit 2 comprises a receiver 25 for receiving control packet signals from the first network-unit 1 via said pooled connection 3 or via other connections 51,52, 61,62, which control packet signal(s) flow(s) via (de)multiplexer 20 either directly via processor 24 to receiver 25 or indirectly via buffer/controller 21 and processor 24 to receiver 25. Detector 27 coupled to said receiver 25 via processor 24 detects said control packet signal(s) from first network-unit 1, whereby an identification code and/or a service code and/or a pooling code in a header of said control packet signal are being detected. In response to this detecting, detector 27 or processor 24 instructs sender 26 to set up one or more connections via said further network in response to said control packet signal(s), by sending one or more further control packet signals via said further network for setting up for example said voice connection. Said further control packet signal(s) flow directly via processor 24 and (de)multiplexer 22 or indirectly via processor 24 and buffer/converter 21 and (de)multiplexer 22 and then via one of said connections 71-75 to said further network. Either said further control packet signal(s) comprise(s) an identification code and/or a service code and/or a pooling code in a header directly defining that data traffic like voice traffic should use the pooled connection 3, or said further control packet signal(s) comprise(s) a code in a header indirectly defining that data traffic like voice traffic should use the pooled connection 3, like for example an identification code identifying one of the terminals. In response to one or more responding control packet signals arriving from the further network via one of said connections 71-75, which responding control packet signal(s) flow(s) via (de)multiplexer 22 either directly via processor 24 to receiver 25 or indirectly via buffer/controller 21 and processor 24 to receiver 25, said responding packet signal(s) is/are received by said receiver 25. Detector 27 coupled to said receiver 25 via processor 24 detects said responding packet signal(s) from the further network arriving via one of said connections 71-75, whereby said responding packet signal(s) either comprise(s) an identification code and/or a service code and/or a pooling code in a header directly defining that data traffic like for example voice traffic should use the pooled connection 3, or said responding packet signal(s) comprise(s) a code in a header indirectly defining that data traffic like for example voice traffic should use the pooled connection 3. In response to this detecting, detector 27 or processor 24 instructs sender 26 to send said or one or more (further) responding packet signals via pooled connection 3 or via other connections 51,52,62,62 to first network-unit 1. Sender 26 coupled to said detector 27 via processor 24 sends in response to said instructing said (further) responding packet signal(s) directly via processor 24 and (de)multiplexer 20 or indirectly via processor 24 and buffer/converter 21 and (de)multiplexer 20 and then via pooled connection 3 or via other connections 51,52, 62,62 to first network-unit 1, but for example just for conversion purposes (for example via buffer/converter 11), after which the information is sent (for example by sender 16) to the terminal(s). By providing said second network-unit 2 with said receiver 25, sender 26 and detector 27, for example a voice connection is automatically set up.

Said manager 23 in said second network-unit 2 comprises a controller 28 for controlling a capacity of said pooled connection 3, to guard the capacity of said pooled connection 3. Thereto, said controller 28 is coupled to said detector 26 via said processor 24 for in response to said detecting of said (responding) control packet signal(s) for example increasing a counter value and comparing the counter value with a threshold. So, the capacity of pooled connection 3 is controlled and/or guarded in network-unit 2. Said controller 28 may have further functions, like for example controlling a forwarding of said further control packet signal(s) via said further network and a receival of responding packet signal(s) via said further network, to guard the availability of said further network. Thereto, said controller 28 is coupled to said detector 26 via said processor 24 for in response to said detecting of said (further) control packet signal(s) for example starting a timer and comparing a length of a time-interval with a threshold, with said timer being reset in response to said detecting of said responding packet signal(s).

The invention is based on the insight, inter alia, that packet switched networks, like ordinary telephony networks, usually just need a small percentage of the maximum capacity, in other words, just a reduced capacity of said maximum capacity needs to be reserved, and that management can be relocated, and is based upon the basic idea, inter alia, that a pooled connection can be used for guaranteeing said reduced capacity, and that the management can be located in the second network-unit. The invention solves the problem, inter alia, of providing a network as defined in the preamble which is more efficient, without requiring said first network-unit setting up signalled connections (with signalled connections being connections to be set up through signalling). Thereto, the second network-unit 2 comprises the manager 23 for managing the exchanging of packet signals via the pooled connection 3, which managing comprises the setting up of connections via the further network and the guarding of the capacity of said pooled connection 3, with said first network-unit 1 comprising the manager 13 for managing for example the converting and routing in said first network-unit 1.

Each embodiment and/or each possibility can be combined with each other embodiment and/or each other possibility.

Each part of network-units 1 and 2, shown in the form of a block or not shown, can be 100% hardware, 100% software or a mixture of both. Therefore, a manager also comprises a managing function, a receiver also comprises a receiving function and a sender also comprises a sending function, and a detector also comprises a detecting function and a controller also comprises a controlling function. Each block shown or not shown can be integrated with each other block shown and/or not shown. Especially in managers 13,23, for example receivers 15,25, senders 16,26, detectors 17,27 and/or controllers 18,28 could advantageously be integrated with processors 14,24. Managers 13,23 and/or processors 14,24 will each comprise a memory not shown, in addition each block can have a further memory not shown for efficiency purposes. Further, in network-unit 1, two or more of said switch 10, buffer/converter 11 and router 12 could be integrated, and in network-unit 2, two or more of said (de)multiplexer 20, buffer/converter 21 and (de)multiplexer 22 could be integrated.

Instead of processors 14,24 being located between the in/outputs of managers 13,23 and receivers 15,25, senders 16,26, detectors 17,27 and controllers 18,28, processors 14,24 could be coupled to a bus further coupled to the in/outputs of managers 13,23 and to receivers 15,25, senders 16,26, detectors 17,27 and controllers 18,28.

The invention claimed is:

1. A network for exchanging packet signals between network-units comprising:
   a first network-unit coupled to terminals, and
   a second network-unit coupled to said first network-unit and to a further network,
   wherein said network comprises a pooled connection between the first network unit and the second network unit,
   wherein a capacity of said pooled connection is smaller than a sum of all terminal-capacities,
   wherein said second network-unit comprises a manager for managing said exchanging,
   wherein said manager in said second network-unit comprises a controller for controlling the capacity of said pooled connection, and
   wherein a number of connections in the pooled connection is established in relation to a number of terminals such that the number of connections in the pooled connection is smaller than the number of the terminals and bandwidth capacity of the number of connections is established in relation to bandwidth capacity of the terminals such that the bandwidth capacity of the number of connection is smaller than the bandwidth capacities of the terminals.

2. The network according to claim 1, wherein said first network-unit comprises a router for routing control packet signals comprising control information originating from terminals to said second network-unit.

3. The network according to claim 2, wherein said first network-unit comprises a manager coupled to said router and comprising a receiver for receiving said control information and a detector coupled to said receiver for detecting said control information for in response to said detecting managing the router.

4. The network according to claim 1, characterised in that said manager in said second network-unit comprises a receiver for receiving control packet signals from the first network-unit and a detector coupled to said receiver for detecting these control packet signals and a sender coupled to said detector for setting up connections via said further network in response to said control packet signals.

5. The network according to claim 1, characterised in that data packet signals comprising data information originating from and/or destined for said terminals flow via said pooled connection.

6. A first network-unit for use in a network for exchanging packet signals between network-units, comprising:
   said first network-unit coupled to terminals; and
   a second network-unit coupled to said first network-unit and to a further network,
   wherein said first network-unit comprises an in/output to be coupled to the second network-unit via a pooled connection between said first network-unit and said second network-unit,
   wherein a capacity of said pooled connection is smaller than a sum of all terminal-capacities,
   wherein said second network-unit comprises a manager for managing said exchanging,
   wherein said manager in said second network-unit comprises a controller for controlling the capacity of said pooled connection, and
   wherein a number of connections in the pooled connection is established in relation to a number of terminals such that the number of connections in the pooled connection is smaller than the number of the terminals and bandwidth capacity of the number of connections is established in relation to bandwidth capacity of the terminals such that the bandwidth capacity of the number of connection is smaller than the bandwidth capacities of the terminals.

7. A second network-unit for use in a network for exchanging packet signals between network-units comprising:
   a first network-unit coupled to terminals, and
   said second network-unit coupled to said first network-unit and to a further network,
   wherein said second network-unit comprises an in/output to be coupled to the first network-unit via a pooled connection between said first network-unit and said second network-unit,
   wherein a capacity of said pooled connection is smaller than a sum of all terminal-capacities,
   wherein said second network-unit comprises a manager for managing said exchanging,
   wherein said manager in said second network-unit comprises a controller for controlling the capacity of said pooled connection, and
   wherein a number of connections in the pooled connection is established in relation to a number of terminals such that the number of connections in the pooled connection is smaller than the number of the terminals and bandwidth capacity of the number of connections is established in relation to bandwidth capacity of the terminals such that the bandwidth capacity of the number of connection is smaller than the bandwidth capacities of the terminals.

8. A method for exchanging packet signals between network-units in a network, said network comprising:
   a first network-unit coupled to terminals; and
   a second network-unit coupled to said first network-unit and to a further network,
   wherein said method comprises exchanging packet signals via a pooled connection between said first network-unit and said second network-unit and managing said exchanging in said second network-unit,
   wherein a capacity of said pooled connection is smaller than a sum of all terminal-capacities, wherein a capacity of said pooled connection is controlled by a manager in said second network-unit, and wherein a number of connections in the pooled connection is established in relation to a number of terminals such that the number of connections in the pooled connection is smaller than the number of the terminals and bandwidth capacity of the number of connections is established in relation to bandwidth capacity of the terminals such that the bandwidth capacity of the number of connection is smaller than the bandwidth capacities of the terminals.

9. A computer readable medium storing a program to be executed on a processor, for exchanging packet signals between network-units in a network, comprising:

a first network-unit coupled to terminals; and a second network-unit coupled to said first network-unit and to a further network, wherein said processor comprises exchanging packet signals via a pooled connection between both network-units, wherein said exchanging is managed in said second network-unit, wherein a capacity of said pooled connection being smaller than a sum of all terminal-capacities, wherein a capacity of said pooled connection is controlled by a manager in said second network-unit, and wherein a number of connections in the pooled connection is established in relation to a number of terminals such that the number of connections in the pooled connection is smaller than the number of the terminals and bandwidth capacity of the number of connections is established in relation to bandwidth capacity of the terminals such that the bandwidth capacity of the number of connection is smaller than the bandwidth capacities of the terminals.

10. A system for exchanging packet signals between network-units, the system comprising:

a first network-unit coupled to terminals;

a second network-unit coupled to said first network-unit and to a further network; and a pooled connection between both network-units for said exchanging of the packet signals, wherein a capacity of said pooled connection is smaller than a sum of all terminal-capacities, wherein said second network-unit comprises a manager for managing said exchanging of packet signals, wherein a capacity of said pooled connection is controlled by a manager in said second network-unit, and wherein a number of connections in the pooled connection is established in relation to a number of terminals such that the number of connections in the pooled connection is smaller than the number of the terminals and bandwidth capacity of the number of connections is established in relation to bandwidth capacity of the terminals such that the bandwidth capacity of the number of connection is smaller than the bandwidth capacities of the terminals.

11. The system according to claim 10, wherein the first network unit is an access provider and the second network unit is a service provider.

12. The system according to claim 11, wherein the second network-unit manages the pooled connection and is connected to the further network that connects the second network-unit to other network elements of a different network and not to the first network-unit.

13. The system according to claim 12, wherein the first network-unit is transparent for control of the packet signals and does not manage the pooled connections and the set up of the pooled connections.

14. The system according to claim 10, wherein the second network-unit manages the pooled connection between the first network-unit and the second network-unit and the first network unit is transparent to control traffic.

15. The system according to claim 10, wherein at least some of the packet signals are voice data and wherein the second network-unit is a gateway to said further network connecting the second network-unit to network nodes other than the first network-unit.

16. The network according to claim 1, wherein the second network-unit manages and controls the pooled connection and the first network-unit is transparent to control traffic.

17. The network according to claim 1, wherein the second network-unit is a gateway to the further network, which connects the second network-unit to network nodes of a different network.

18. The network according to claim 1, wherein the second network units controls the capacity of the pooled connection.

19. The network according to claim 1, wherein said network comprises an un-pooled connection between both network-units.

20. The network according to claim 19, wherein control packet signals comprising control information flow via the un-pooled connection and wherein data packet signals flow via the pooled connection.

21. The network according to claim 20, wherein said second network unit receives and detects said control packet signals to set up a connection via said further network.

22. The network according to claim 1, wherein said first network unit is coupled to a plurality of second network units and wherein each of the plurality of the second network units comprise a pooled connection between the respective second network unit and said first network unit.

23. The network according to claim 22, wherein said first network unit receives and detects control information for selecting one of the plurality of second network units.

24. The network according to claim 1, wherein said first network-unit comprises a further manager that, in response to detecting control information from one of the terminals, selects one of the number of said pooled connection.

* * * * *